United States Patent
Lenglet et al.

(10) Patent No.: US 6,824,902 B2
(45) Date of Patent: Nov. 30, 2004

(54) PROCESS AND DEVICE FOR PRODUCTION OF ELECTRICITY IN A FUEL CELL BY OXIDATION OF HYDROCARBONS FOLLOWED BY A FILTRATION OF PARTICLES

(75) Inventors: Eric Lenglet, Rueil Malmaison (FR); Pierre Boucot, Ternay (FR); Gérard Henri Martin, Saint Genis Laval (FR)

(73) Assignee: Institut Francais du Petrole, Cedex Rueil Malmaison (FR)

( * ) Notice: Subject to any disclaimer, the term of this patent is extended or adjusted under 35 U.S.C. 154(b) by 308 days.

(21) Appl. No.: 10/067,921

(22) Filed: Feb. 8, 2002

(65) Prior Publication Data

US 2002/0106538 A1 Aug. 8, 2002

(30) Foreign Application Priority Data

Feb. 8, 2001 (FR) .............................. 01 01714

(51) Int. Cl.[7] .......................... H01M 8/06; C01B 3/02; B01C 3/00; B01D 41/00
(52) U.S. Cl. ............................ 429/17; 429/19; 429/20; 423/648.1; 423/651; 423/215.5
(58) Field of Search ........................... 429/17, 19, 20; 423/648.1, 650, 651, 215.5; 95/273, 278, 279

(56) References Cited

U.S. PATENT DOCUMENTS 5,897,970 A    4/1999  Isomura et al.
6,077,490 A  * 6/2000  McIlroy et al. .......... 423/215.5

FOREIGN PATENT DOCUMENTS

| JP | 6-111844 | 4/1994 |
|----|----------|--------|
| WO | WO 99/46032 | 9/1999 |
| WO | WO 00/78443 A1 | 12/2000 |

OTHER PUBLICATIONS

Patent Abstract of Japan, publication No. 06111844, publication date Apr. 22, 1994, application No. 03043298.

* cited by examiner

*Primary Examiner*—Susy Tsang-Foster
(74) *Attorney, Agent, or Firm*—Millen White Zelano & Branigan, P.C.

(57) ABSTRACT

The present invention relates to a process for the production of electricity in a fuel cell from hydrocarbons that includes passing a cooled effluent in a first circuit having at least one filter for depositing soot in the filter. The filter is regenerated when concurrently passing the cooled effluent in a second circuit. The present invention also relates to a device for implementing the process.

19 Claims, 2 Drawing Sheets

PROCESS AND DEVICE FOR PRODUCTION OF ELECTRICITY IN A FUEL CELL BY OXIDATION OF HYDROCARBONS FOLLOWED BY A FILTRATION OF PARTICLES

The invention relates to a process and a device for the production of electricity from hydrocarbons and that uses a fuel cell.

The applications may relate to stationary systems or on-board systems for the production of electricity or co-generation of electricity/heat.

The technological background is illustrated by Patent U.S. Pat. No. 5,897,970 and Patent Applications WO 99/46032, WO 00/78443 and JP 06 111844 (Patent Abstracts of Japan, Vol. 018, No. 382 (E-1580), Jul. 19, 1994).

Systems for the production of electricity from hydrocarbon feedstocks that comprise a fuel cell and a "fuel processor" making it possible to transform fuel (the hydrocarbon feedstock) into a gas mixture H2/CO/CO2/H2O) or synthesis gas, making it possible, optionally after treatment, to feed a fuel cell, are already known.

Different types of fuel processors are known, in particular systems that use vaporeforming of hydrocarbons for their transformation of rich gas into H2/CO/CO2/H2O. The partial oxidation of POX (for "partial oxidation") is also known. This technique uses a burner that operates with an amount of oxidant (air or oxygen) that is less than the combustion stoichiometry. Water is often added to the oxidant and/or to the hydrocarbon feedstock to improve the hydrogen production and to reduce or to eliminate the soot formation. This soot production is the main problem of partial oxidation, in particular with the liquid hydrocarbon feedstocks that often contain aromatic and olefinic compounds that are soot precursors.

The autothermal process (or ATR) that comprises a partial oxidation and a catalytic reforming of the hot gaseous effluents of the partial oxidation are also known.

There, too, soot formation is a very significant problem, whereby the soot deactivates the catalyst if it exists in too large an amount.

The elimination of soot contained in a synthesis gas that is obtained from a partial oxidation unit is a known industrial problem: the operation is performed by washing the gas and recovering soot by water.

It was also already proposed to use a soot filter for industrial units. For example, U.S. patent application Ser. No. US 1999-271741 indicates the problem of eliminating soot corresponding to "1 to 3%" of the carbon of the feedstock in the form of "unreacted soot," by alternate combustion in two candle filters. The feedstocks that are mentioned are carbon, black liquor and hydrocarbon fuels.

The candle filters are bulky devices that are more suitable for industrial units than for providing small amounts of hydrogen-rich gas, for example for feeding fuel cells.

Furthermore, very compact soot filters that are used for the filtration of effluents of diesel engines are known.

These filters are clearly incompatible with amounts of soot such as those mentioned above.

SUMMARY OF THE INVENTION

The first object of the invention is a process and a device that make it possible to produce electricity in a fuel cell that is fed by a gas that was obtained by partial oxidation and that has no soot problem.

The second object of the invention is a process and a simplified and economical device for eliminating soot.

For this purpose, the invention describes a process for the production of electricity in a fuel cell from hydrocarbons that comprise a partial oxygenation stage of hydrocarbons, characterized in that a) A stream 2 that contains a hydrocarbon feedstock with boiling points that are less than about 400° C. is fed b) The stream is preheated to a temperature of at least 200° C., enough so that said stream is entirely evaporated, c) An air-carrying gaseous oxidant stream 1 is fed, and the oxidant stream is preheated to a temperature of at least 400° C.

d) The two gaseous streams are reacted in a partial oxidation zone 3 or chamber, whereby the operating conditions of this chamber are in the following range:
   Dwell time in the chamber of between 100 and 1200 milliseconds
   Output temperature of the chamber of between 1150 and 1650° C.
   Pressure of the chamber of between 0.1 and 1.5 MPa, and preferably 0.15 MPa to 0.8 MPa whereby the output temperature of the chamber is adequate so that at least 90% of the carbon of the feedstock is converted into CO or CO2 and that the amount of soot contained in the effluent is less than 0.1% by weight relative to the feedstock, preferably between 0.5 ppm and 100 ppm (1 ppm=1 part per million)

e) The effluent of the chamber is cooled to a temperature of between 200° C. and 1050° C. and preferably between 500° C. and 900° C.

f) The cooled effluent is circulated in at least one zone for recovery and treatment of soot that comprises a first circuit 6 comprising at least a first filter 7 and a second circuit 41 that are mounted in parallel; a stage for filtration of the effluent in the first filter is carried out for a period of time in order to deposit soot there; the first filter containing the soot is regenerated in the presence of a gas that contains oxygen for another period of time, and during said other period of time, the cooled effluent is circulated in the second circuit, whereby said first filter has a high density such that the filtration surface area/useful volume ratio is between 80 and 5000 $m^{-1}$ and a hydrogen-rich effluent that is exiting the recovery zone is recovered g) A fuel cell 10 is fed by at least a portion of the effluent that is exiting the recovery zone.

The oxidation chamber that is equipped with at least one burner can be a stirred chamber or a piston-flow chamber or a mixed-flow chamber.

The particle filters are generally compact. In general, filters made of ceramic whose filtration surface area/filter volume ratio is the highest possible will preferably be selected, knowing that the back pressure generated by the filter under these conditions is lower.

It is possible to obtain excellent filtration results with a filtration surface area/filter volume ratio of in general between 80 $m^{-1}$ and 5000 $m^{-1}$ and preferably between 150 and 1500 $m^{-1}$, thereby reducing the regeneration frequency. The filters that are generally recommended can be those that are used to retain the particles of diesel engines in the automobile industry that have an efficiency that is higher than 70%, preferably higher than 90% and more particularly between 93 and 98%, as is the case for multitube filters with a honeycomb structure. It is advantageously possible to use monoliths that are made of ceramic, cordierite or silicon carbide with greater than 90% efficiency or filters with ceramic fibers that are wound around cylinders that are pierced with holes, with an efficiency that is higher than 75% but with lower back pressure.

It is also possible to use filters with ceramic- or glass-woven fibers or with sintered metals that are compatible with the temperature of the effluents that circulate in the filter, higher than the soot combustion temperature.

According to a characteristic of the invention, the second circuit of the recovery zone can contain at least one filter. It can contain a catalyst for vapor reforming recovered soot to gasify it while the first filter is in a regeneration period.

According to a variant, it is possible to regenerate the filter of the second circuit in the presence of a gas that contains oxygen for at least a portion of the period of time of the filtration stage in the first filter.

The effluents that are obtained from the regeneration of the first filter by soot combustion can be mixed with the effluent that circulates in the second circuit and introduced into the fuel cell. According to a variant, these regeneration effluents can be withdrawn from the first filter.

According to another characteristic of the invention, the gaseous oxidant stream and/or the hydrocarbon feedstock can contain the water vapor in an $H_2O$/hydrocarbon mass ratio of between 0.1 and 2.0, preferably between 0.4 and 1.2.

The fuel cells can be an electrolyte-type cell with solid oxide (SOFC) with little sensitivity to impurities, a polymer electrolyte cell (PEMFC type) or a phosphoric acid cell, whereby the latter two cells are particularly sensitive to the content of carbon monoxide and hydrogen sulfide that it is preferable to reduce.

It therefore proves advantageous to carry out at least one stage for at least partial elimination of hydrogen sulfide and carbon monoxide from the effluent that is obtained from the recovery zone.

According to another characteristic of the invention, it may be advantageous to modify the operating conditions of the partial oxidation zone during the regeneration periods of the first filter to reduce the amount of soot produced during said periods and circulating in the second circuit.

The invention also relates to a device for the production of electricity that comprises in combination:

A circuit 1 for feeding an air-rich oxidant stream that is connected to at least one heat exchanger 5 for the reheating of said stream, At least one partial oxidation chamber that is connected to heat exchanger 5 and to a feed stream 2 of a hydrocarbon-rich stream for the partial oxidation of hydrocarbons for the reheated oxidant stream at an adequate temperature for obtaining a conversion of the hydrocarbons that is higher than 90% and the formation of soot in an amount that is less than 0.1% by weight relative to the hydrocarbons Partial oxidation chamber 3 that is connected upstream to the exchanger Soot recovery and treatment means that have an inlet connected to heat exchanger 5 and that comprise a first circuit 6 that comprises at least a first filter 7 and a second circuit 41 that are mounted in parallel, whereby the first filter also comprises regeneration means 20, 21 that are sequential by soot combustion, whereby the first filter has a filtration surface area/useful volume ratio of between 80 and 5000 $m^{-1}$ and preferably between 150 and 1500 $m^{-1}$, and whereby the recovery and treatment means have an outlet 9 for effluents from which soot has been removed and that are rich in hydrogen, At least one fuel cell that is connected to the outlet of the effluents of the recovery and treatment means, suitable for producing electricity, Means for alternating use of soot recovery and treatment means 30, 31, 32, 35 that are connected to regeneration means of 20, 21 first filter 7.

BRIEF DESCRIPTION OF THE DRAWING FIGURES

The invention will be better described by the following figures that illustrate two embodiments of the device, among which:

Figure 1:
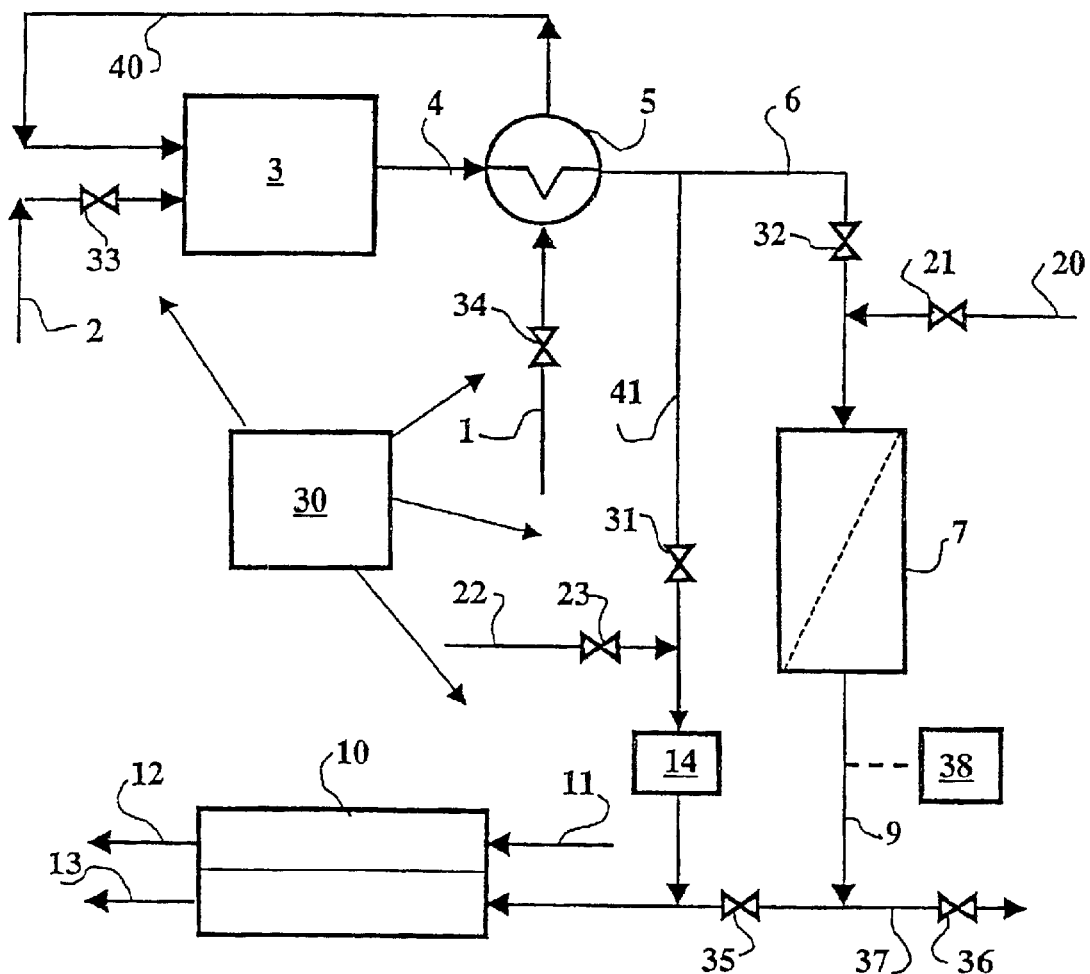
FIG. 1 represents an installation for the production of electricity with a chamber for partial oxidation of hydrocarbons, a heat exchanger, a soot filter and a fuel cell.

A pipe 1 for feeding a mixture of air and water vapor, comprising a control valve 34, is connected to a heat exchanger 5 for its reheating to high temperature. At the outlet of exchanger 5, this hot oxidant stream feeds a partial oxidation chamber 3, or POX, via pipe 40. The chamber comprises a first zone that is a mixing zone followed by a second zone that is a piston-flow zone.

This chamber is also fed by a stream that contains a hydrocarbon feedstock, for example an entirely evaporated mixture of vapor and hydrocarbons, via a pipe 2 that comprises a control valve 33.

The partial oxidation effluents that comprise CO, $CO_2$, $H_2$, $H_2O$ and transported soot circulate in pipe 4 and are cooled in heat exchanger 5 in which they transfer the heat to the oxidant stream.

At the outlet of exchanger 5, the cooled gases circulate in a pipe 6 (first circuit) that comprises an isolating valve 32 and feed a compact main soot filter 7 that is made of ceramic. This filter can contain a vaporeforming catalyst on at least one portion of its filtering surface. Downstream from the filter, the filtered gases circulate in a pipe 9 and feed a solid oxide electrolyte-type fuel cell 10 (SOFC).

After consumption of the majority of the hydrogen and carbon monoxide that feed this cell, a residual stream is evacuated at the outlet of the cell via pipe 13.

An air stream feeds the cell via a pipe 11 and comes out from cell 10, low in oxygen and loaded with water vapor via a pipe 12.

A pipe 20 that comprises an isolating valve 21 makes it possible to feed sequentially an air stream or oxidant (dilute air) stream to filter 7 to regenerate it by combustion of the soot deposited in this filter.

The installation also comprises a pipe 41 to allow gases that are obtained from partial oxidation during the regeneration phases of filter 7 to bypass this filter 7 (through the second circuit). This pipe 41 comprises an isolating valve 31 and feeds an auxiliary filter 14 with a capacity that is generally less than that of filter 7. This auxiliary filter can have the same characteristics as those of filter 7 or else it can have conventional characteristics to the extent that a small amount of effluent circulates in circuit 41 and it can then be replaced. This filter in particular can contain a nickel vaporeforming catalyst that makes it possible to gasify small amounts of soot during periods or phases for regeneration of the main filter. Outlet pipe 9 of the filter on which a valve 35 is placed comprises a pipe 37 for evacuating regeneration effluents controlled by a valve 36. Furthermore, it is connected to means 38 for measuring the oxygen content of the gas that exits the filter, making it possible to know if the regeneration of the filter and the combustion of the soot are completed.

The installation also comprises control means 30 such as a programmable automatic system or a computer that makes it possible to run different operating phases of the installation: start-up, stopping, soot regeneration phases, normal operation. These means 30 are connected to elements that make it possible to control the process and its operating variables 33, 34, 31, 32, 21, 38 by connections, not shown.

Figure 2:
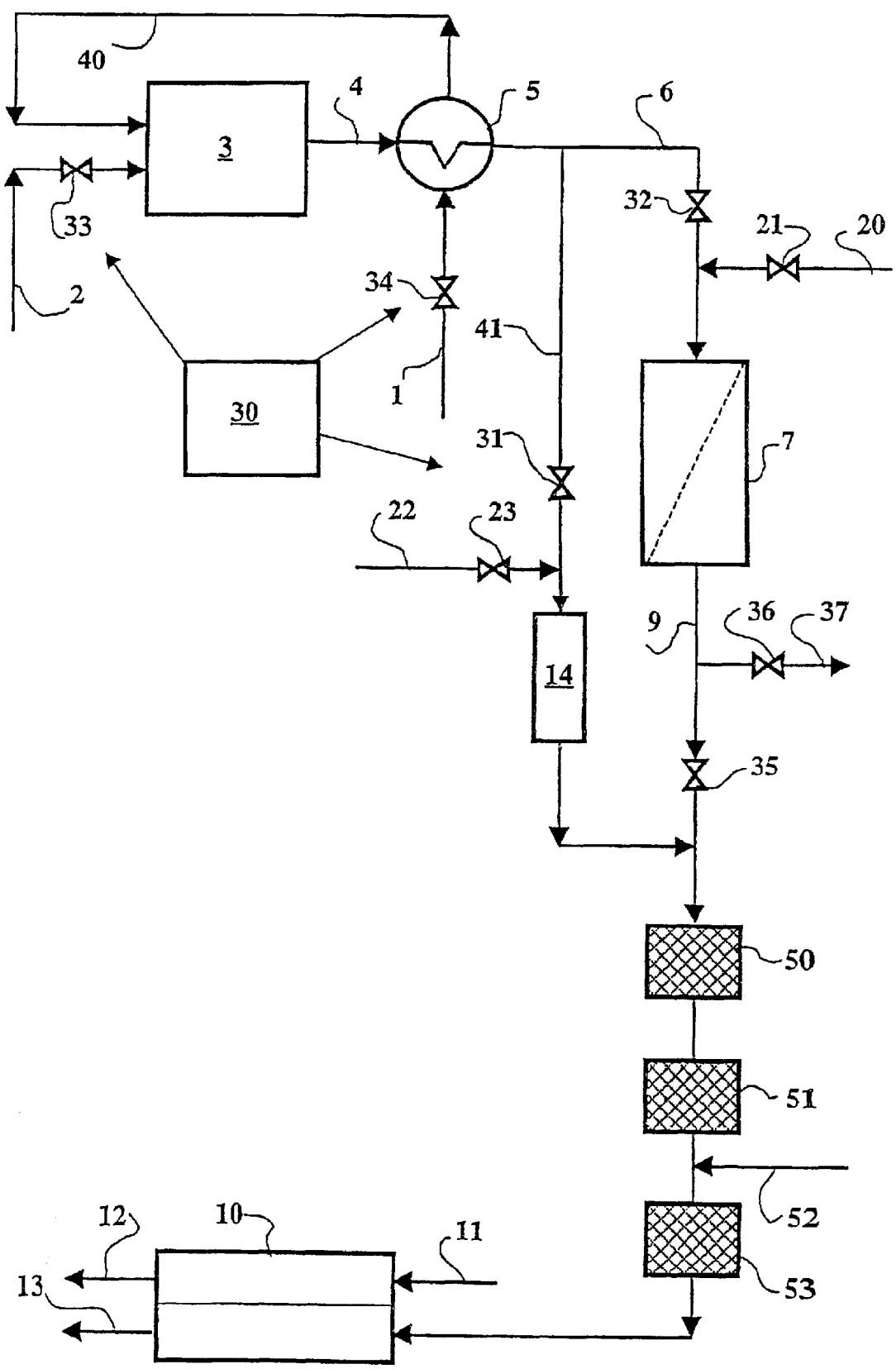
FIG. 2 illustrates a device or the fuel cell of purification elements.

FIG. 2 shows an installation variant according to the process of the invention. This installation uses, with the same numbering, most of the different elements of FIG. 1.

A first difference relates to the evacuation of effluents from the regeneration of the filter.

Outlet pipe 9 of the filter comprises an isolating valve 35 and is connected upstream from this valve to a pipe 37 for evacuating regeneration effluents, comprising an isolating valve 36.

Upstream from the auxiliary filter, line 41 also comprises an input of water vapor via a pipe 22 that is controlled by a valve 23.

Downstream from pipe 9, the installation of FIG. 2 further comprises different zones for clean-up of purified gases that exit from the soot filter.

A zone 50 is a zone for elimination of H2S on a granular adsorbent bed that contains, for example, zinc oxide. It can also comprise a zone for catalytic reforming of residual hydrocarbons. A zone 51 that can comprise two parts is a zone for catalytic transformation of CO into hydrogen by the balanced reaction CO+H2O→CO2+H2. This operation is well known industrially ("shift conversion" or "water gas shift"). A zone 53 is a zone for final elimination of CO up to a residual content of several ppm of volume relative to the treated gas, for example 10 ppm.

This preferred oxidation operation (or PROX) is made possible by the introduction via pipe 52 of an amount of air that is adapted to the amount of CO to be eliminated. The installation of FIG. 2 also comprises thermal means, not shown, such as thermal exchangers, that make it possible to adapt the temperatures of different zones 50, 51, 53 and the temperature at the inlet of fuel cell 10 to the requisite values. Typically, the fuel cell of FIG. 2 is a polymer electrolyte cell (of PEMFC type) or a phosphoric acid cell.

The description of the operation of the installation of FIG. 1 is illustrated by the example.

The stabilized operation of the partial oxidation chamber is regulated under the following conditions:

Hydrocarbon feedstock: gas oil, with a final boiling point of 370° C.;
Pressure of the chamber 0.25 MPa;
Output temperature of the chamber 1460° C.;
Preheating of the hydrocarbons 480° C.;
Water vapor that is added to air with an H2O/hydrocarbon mass ratio=0.4;
Dwell time in the chamber: 800 milliseconds;
Preheating of the air-water vapor mixture: 800° C.;
O2/C ratio: suitable, based on the nature of the gas oil, for obtaining the output temperature of the chamber;
Output temperature of the gases of the exchanger and input temperature of the soot filter: 740° C.

The soot filter that is used is of the multichannel type with a microporous surface based on silicon carbide, with a characteristic dimension of the channels of between 1 and 5 mm, of a type that is similar to filters that are used at the outlet of automobile diesel engines. The filtration surface area/filter volume ratio is 800 m$^{-1}$, for example. Its efficiency is 96%.

When a high pressure drop of filter 7 indicating a significant backblowing by the soot is detected, process controller 30 modifies the positions of valves 33 and 34, regulating the operating conditions to obtain at least one of the following two actions:

Increase of the output temperature (for example, nonlimiting from 50 to 150° C.),
Increase of the amount of added water vapor (for example to obtain in a nonlimiting way an H2O/hydrocarbon mass ratio of between 0.8 and 1.5).

By way of example, it is possible to increase the temperature (by increasing the air that is fed) up to 1500° C., with an H2O/hydrocarbon mass ratio of 1.2. Under these conditions of reduced energy output, very small or negligible amounts of soot (less than 2 ppm, for example) are produced, and it is temporarily possible to bypass the filter and to initiate its regeneration without risks of clogging. Auxiliary filter 14 that contains, for example, a vaporeforming catalytic bed is not substantially clogged.

If these modified operating conditions are used essentially to eliminate the soot, filter 14 can be eliminated.

When modified operating conditions (less advantageous in terms of energy but better for reducing the soot) are obtained, valve 31 of circuit 41 for bypassing the filter is opened, valve 32 is closed, and valve 21 is opened to feed a mixture of air that is diluted by water vapor in order to burn the soot. The end of the combustion of the soot is detected by oxygen probe 38 and makes it possible to reconfigure the system in gas filtration position by reopening valve 32 and closing valves 31 and 21.

FIG. 2 operates similarly with a difference in terms of the evacuation of the effluents from the filter during regeneration phases: during these phases, valve 35 is closed, valve 36 is opened, and the regeneration gases are evacuated via pipe 37.

It would also be possible to use this device in the installation of FIG. 1. In particular, it may be useful if for this installation that uses a solid oxide electrolyte cell (SOFC), catalytic treatments of the gases upstream from the fuel cell are also used, such as the elimination of the sulfur in an adsorption zone 50, for example on zinc oxide, or shift conversion zone 51.

The regeneration effluents thus cannot disturb these catalytic zones.

The invention makes it possible to obtain very small amounts of soot, less than 1000 ppm by weight, relative to the hydrocarbons that are fed, and often less than 400 ppm, in particular less than 150 ppm, whereby the preferred values are less than 50 ppm. It also makes it possible, unexpectedly, to use very compact filters and soot filter technologies, developed for the automobile industry, which could not be conceivable in the prior art, whereby these filters are used for the elimination of traces of soot only.

What is claimed is:

1. A process for the production of electricity in a fuel cell from hydrocarbons, comprising a partial oxygenation stage of hydrocarbons, said process comprising
    a) providing a stream (2) containing a hydrocarbon feedstock having a boiling point less than about 400° C.,
    b) preheating said stream to a temperature of at least 200° C., so that said stream is entirely evaporated to form a hydrocarbon gaseous stream,
    c) preheating an air-carrying gaseous oxidant stream (1) to a temperature of at least 400° C.,
    d) reacting the hydrocarbon gaseous stream with the preheated air-carrying gaseous stream in a partial oxidation chamber, under operating conditions in the following ranges:
  (i) dwell time in the chamber of between 100 and 1200 milliseconds,
  (ii) output temperature of the chamber of between 1150 and 1650° C.,
  (iii) pressure of the chamber of between 0.1 and 1.5 MPa,
  and so that the output temperature of the chamber is adequate to convert at least 90% of the carbon of the feedstock into CO or CO2 and that the amount of soot contained in the effluent is less than 0.1% by weight relative to the feedstock,
e) cooling the effluent of the chamber to a temperature of between 200° C. and 1050° C.,
f) circulating the cooled effluent in at least one zone for recovery of hydrogen and treatment of soot, said zone comprising a first circuit (6) comprising at least a first filter (7) and a second circuit (41) mounted in parallel; depositing soot in the first filter; regenerating the first filter containing the soot in the presence of a gas that contains oxygen, and concurrently circulating the cooled effluent in the second circuit, said first filter having a filtration surface area/useful volume ratio between 80 and 5000 $m^{-1}$, and withdrawing a hydrogen-rich effluent from said at least one zone for recovery, and
g) feeding a fuel cell (10) with at least a portion of the withdrawn hydrogen-rich effluent from the recovery zone.

2. A process according to claim 1, wherein the second circuit contains at least one soot filter (14).

3. A process according to claim 2, wherein the filter of the second circuit contains a vapor reforming catalyst of the soot that is collected to gasify it while the first filter is regenerated.

4. A process according to claim 2, wherein the filter of the second circuit is regenerated in the presence of a gas that contains oxygen for at least a portion of a filtering cycle for the first filter.

5. A process according to claim 1, wherein regeneration effluents of the first filter are drawn off from the first circuit.

6. A process according to claim 1, wherein the hydrocarbon feedstock contains water vapor in an H2O/hydrocarbon mass ratio of between 0.1 and 2.0.

7. A process according to claim 1, further comprising measuring the oxygen content of the effluent that exits the recovery zone.

8. A process according to claim 1, further comprising conducting at least one at least partial elimination stage of the hydrogen sulfide and carbon monoxide of the effluent that is obtained from the recovery zone.

9. A process according to claim 1, wherein the fuel cell is an electrolyte-type cell with solid oxide (SOFC).

10. A process according to claim 1, wherein the fuel cell is a polymer electrolyte cell (PEMFC type) or a phosphoric acid cell.

11. A process according to claim 1, further comprising adjusting the operating conditions of the partial oxidation chamber during the regeneration periods of the first filter to reduce the amount of soot produced during said periods and circulating in the second circuit.

12. A device producing electricity by the process according to claim 1, comprising in combination:
  a circuit (1) for feeding an air-rich oxidant stream that is connected to at least one heat exchanger (5) for the reheating of said stream,
  at least one partial oxidation chamber that is connected to heat exchanger (5) and to a feed stream (2) of a hydrocarbon-rich stream for the partial oxidation of hydrocarbons for the reheated oxidant stream at an adequate temperature for obtaining a conversion of the hydrocarbons that is higher than 90% and the formation of soot in an amount that is less than 0.1% by weight relative to the hydrocarbons,
  partial oxidation chamber (3) that is connected downstream to the exchanger for passing the effluent from the chamber through the exchanger,
  soot recovery and treatment means that have an inlet connected to heat exchanger (5) and that comprise a first circuit (6) that comprises at least a first filter (7) and a second circuit (41) that are mounted in parallel, wherein the first filter also comprises regeneration means (20, 21) that are sequential by soot combustion, wherein the first filter has a filtration surface area/useful volume ratio of between 80 and 5000 $m^{-1}$, and wherein whereby the recovery and treatment means have an outlet (9) for effluents from which soot has been removed and that are rich in hydrogen,
  at least one fuel cell that is connected to the outlet of the effluents of the recovery and treatment means, suitable for producing electricity,
  means for alternating use of soot recovery and treatment means (30, 31, 32, 35) that are connected to regeneration means of first filter (20, 21).

13. A device according to claim 12, wherein means (30) for alternating use comprise means (33, 34) for modification of the operating conditions of the partial oxidation chamber during regeneration periods of the first filter for the reduction of the amounts of soot produced during these periods and that circulate in the second circuit.

14. A device according to claim 12, wherein the second circuit comprises a soot filter.

15. A device according to claim 12, further comprising means (50, 51, 52, 53) for clean-up of effluents inserted between the outlet of the soot recovery and treatment means and fuel cell (10).

16. A process according to claim 1, wherein the operating pressure of the chamber is between 0.15 and 0.8 MPa, the amount of soot in the effluent is between 0.5 and 100 ppm, and the effluent is cooled to between 500 and 900° C.

17. A process according to claim 6, wherein the H2O/hydrocarbon mass ratio is between 0.4 and 1.2.

18. A device according to claim 12, wherein the first filter has a filtration surface area/useful volume ratio of between 150 and 1500 $m^{-1}$.

19. A process according to claim 1, wherein the gaseous oxidant contains water vapor.

* * * * *